E. A. & J. A. JONES.
APPARATUS FOR SUPPLYING WATER TO ROTARY PUDDLING FURNACES.
No. 173,643. Patented Feb. 15, 1876.
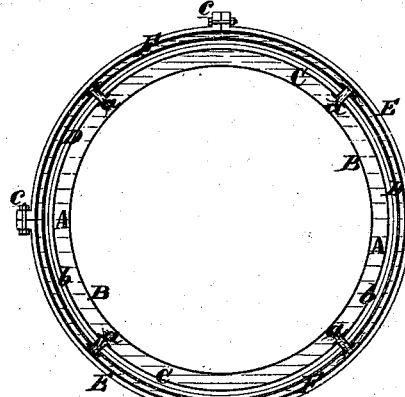
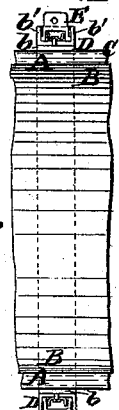
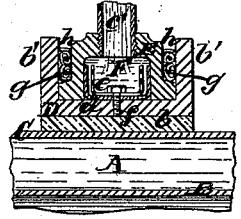
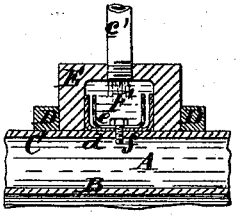
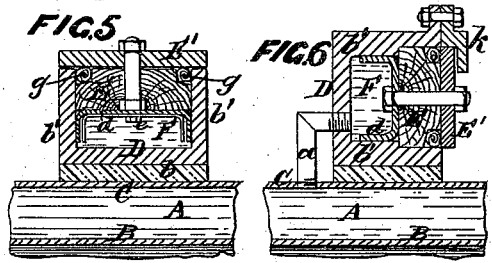
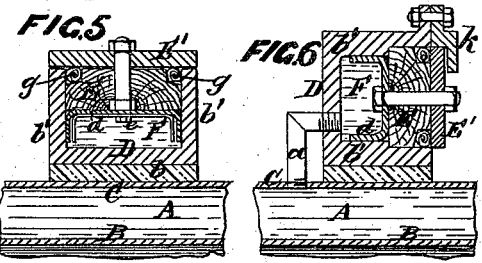
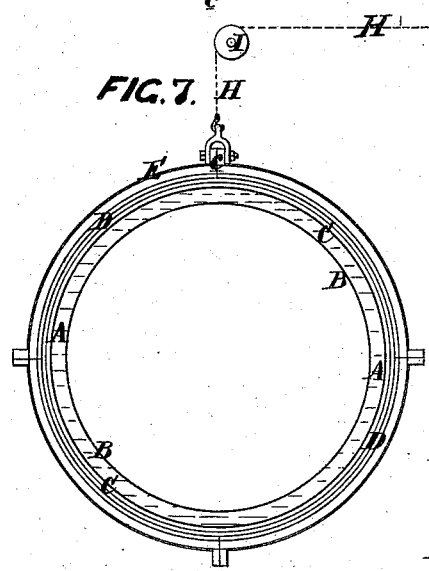
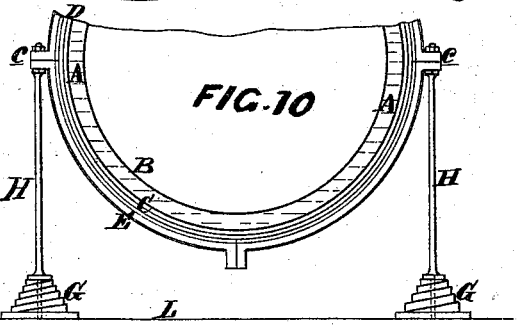
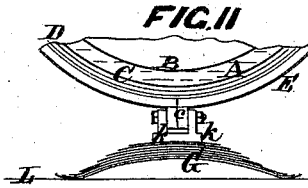
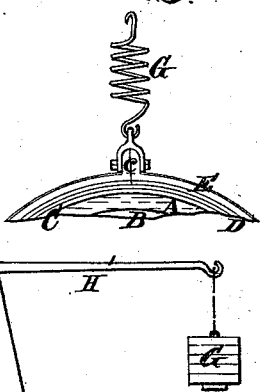
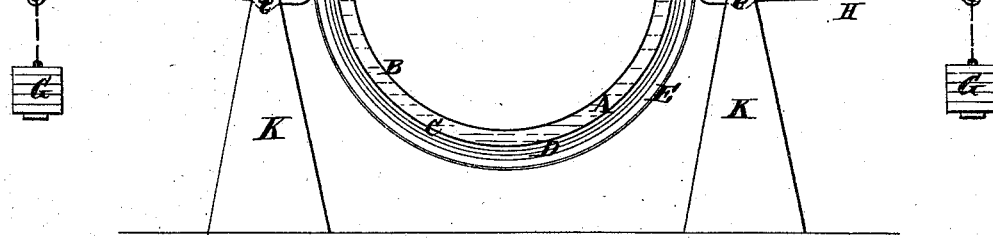

UNITED STATES PATENT OFFICE.

EPHRAIM A. JONES AND JOHN A. JONES, OF MIDDLESBROUGH, ENGLAND.

IMPROVEMENT IN APPARATUS FOR SUPPLYING WATER TO ROTARY PUDDLING-FURNACES.

Specification forming part of Letters Patent No. 173,643, dated February 15, 1876; application filed January 10, 1876.

*To all whom it may concern:*

Be it known that we, EPHRAIM ALLCOCK JONES and JOHN ALLCOCK JONES, both of Middlesbrough, in the county of York, England, have invented Improvements in Apparatus for Supplying Rotary Puddling-Furnaces with Water, of which the following is a specification:

Our invention relates to the adaptation to rotary puddling-furnaces of improved means of supplying water for circulation around the furnace; and consists in admitting a continuous stream of water to the water chamber or space between the two casings, (when the furnace is composed of two casings practically water-tight,) and maintaining the chamber or space full of water by means of rings or tubes applied in the following manner, reference being had to the several figures of the accompanying drawings, in which the same letters indicate corresponding parts.

Figure 1 of our drawings represents a transverse section of a rotary puddling-furnace fitted with rings for the admission of water according to our invention. Fig. 2 is a corresponding longitudinal section of a portion of the furnace; and Fig. 3 is an enlarged sectional detail, showing the construction and arrangement of the rings.

A is the water chamber or space, which is formed by the inner casing B and the outer casing C, to the latter of which we attach, by means of screwed tubular connections $a$ $a$ and nuts a metal ring, D, which consequently revolves with the furnace, a layer, $b$, of any suitable material, being, if desired, interposed between the ring D and the casing C. The ring D is cast or otherwise formed with annular flanges $b'$ $b'$, so as to produce a trough or channel in cross-section, in which there is placed a stationary ring, E, of nearly a similar form to the ring D, but inverted, the ring E being, by preference, constructed in segments bolted together at $c$. The two rings D E form between them an annular chamber or space, F, for the admission of water, which is supplied thereto by a pipe, $c'$, screwed into the ring E, and thence passes through the tubes $a$ $a$ into the water-chamber A. An annular flexible ring or band, $d$, of U shape in cross-section, surrounded by an annular metal washer, $e$, is employed in the interior of the water-space F for the purpose of preventing leakage between the rings D and E, such ring $d$ and washer $e$ being attached to the ring D by screws $f$, as shown. In order to further assist in obtaining a tight joint, there may be placed on either side of the ring E, between its surface and the corresponding flange $b'$ of the ring D, a coil of packing, $g$, which is maintained in position by a metal band, $h$, surrounding it, as shown in Fig. 3.

The rings for the admission of the water and their accessories may be modified in various ways—for example, in Fig. 4 the ring E is arranged in contact with the outer casing C, a packing ring or band, $d$, and washer $e$ being employed as before, in order to maintain a tight-joint. In the modification, Fig. 5, the stationary ring is made in two parts, videlicit, an annular ring, E, of wood or other suitable material, to which the packing-ring $d$ and washer $e$ are attached, and an outer ring, E', secured to the ring E, packing $g$ being interposed, as shown. A somewhat similar arrangement of the stationary ring, but differently situated, is illustrated in Fig. 6. In this case the ring D is attached to the casing C by means of elbow-pipes $a$, which also form the communication between the water-space F and the water-chamber A, and the ring D is further provided with a flange, $k$, bolted to it, so as to overlap the ring E'.

By means of these arrangements a continuous stream of water is supplied to the water chamber or space between the two casings, while no appreciable leakage can take place, as the band is maintained in contact with the surfaces by the pressure of the water acting upon it. We also employ, in combination with the arrangements hereinbefore described, means of balancing or suspending the stationary ring E, whereby the pressure due to its weight acting against the revolving ring D is relieved, the friction and consequent wear of the rings are diminished, and a considerable saving is effected in the motive power required for working the furnace. This part of our invention is illustrated in Figs. 7, 8, 9, 10, and 11, which represent, respectively, transverse sections of rotary puddling-furnaces, with five modifications of our improvements applied to the stationary ring, the latter being shown in elevation.

Figs. 7 and 8 show the application of balance-weights G for the purpose of balancing or suspending the ring E. In the arrangement, Fig. 7, the weight G is connected to the flanges $c$ of the ring E by means of a chain, H, passing over pulleys I I. In the modification, Fig. 8, the weights G G are suspended at the outer ends of the levers H' H', which are mounted, respectively, on centers or fulcra $i\ i$ in standards K K at each side of the furnace, and support by their opposite ends the flanges $c\ c$ of the ring E.

Figs. 9, 10, and 11 illustrate the application of springs in substitution for the balance-weights. In the arrangement, Fig. 9, a spiral spring, G, is employed, suspended from a fixed point above and connected at its lower end to the flanges $c$ of the ring E. In the modification, Fig. 10, the ring E is suspended by means of volute springs G G resting upon the base-plate L of the machine, and attached, respectively, to the lower extremities of vertical rods H H, secured at their upper ends to the flanges $c\ c$ of the ring E. In the modification, Fig. 11, we employ a carriage suspension-spring, G, which rests upon the base-plate L, and is provided with upward projections $k\ k$, embracing the flanges $c$, and forming a yielding support for the ring E.

In lieu of employing balance weights or springs the stationary ring may be maintained in a state of suspension by means of screws or equivalent mechanical devices.

The arrangements hereinbefore described, while effecting the suspension of the ring E, also serve to counteract any tendency which it may have to rotate with the revolving ring D. The means of balancing or suspending the stationary ring are also applicable with rings of other construction than that hereinbefore described, and in combination or not with any suitable description of packing.

We are aware that a stationary hollow ring of a box or closed section, having apertures for the passage of the water into the water-chamber of the furnace, has previously been applied, in combination with the revolving rings, to the end of a rotary puddling-furnace, and therefore to this arrangement we make no claim; but

What we claim as our invention is—

1. The improvement in double-cased rotary puddling-furnaces, which consists in the combination therewith of revolving and stationary rings, fitted or placed around the external periphery of such furnace, and constructed and arranged and combined with flexible bands in such a manner that a revolving ring or rings and a stationary ring or rings together form an annular water-passage, which is maintained tight by means of a flexible band acted upon by the pressure of the water, substantially as and for the purposes hereinbefore described, and as illustrated by our drawings.

2. The combination, with revolving and stationary rings applied to a double-cased rotary puddling-furnace for the purpose herein set forth, of means of balancing or suspending the stationary rings, substantially as hereinbefore described.

In witness whereof we have signed our names to this specification in the presence of two subscribing witnesses.

E. A. JONES.
J. A. JONES.

Witnesses:
FREDERICK CHALMER,
127 *Strand, London.*
JOHN C. GLOWBRA,
32 *Broad Chase,*
*Newcastle-on-Tyne.*